Figure 1:
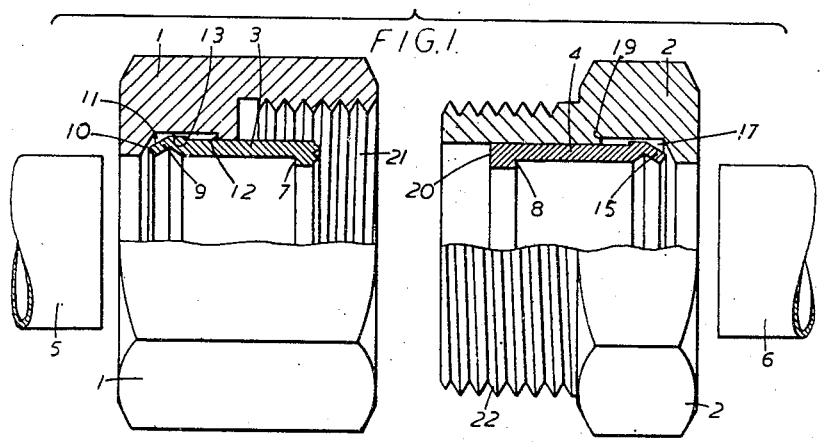

April 11, 1950     B. N. R. LAMONT     2,503,826
PIPE COUPLING

Filed Feb. 19, 1946     4 Sheets-Sheet 1

Inventor
Boyd N. R. Lamont
By
Ralph B. Stewart
Attorney

April 11, 1950     B. N. R. LAMONT     2,503,826
PIPE COUPLING

Filed Feb. 19, 1946     4 Sheets-Sheet 2

Inventor
Boyd N. R. Lamont
By
Ralph B. Stewart
Attorney

April 11, 1950     B. N. R. LAMONT     2,503,826
PIPE COUPLING

Filed Feb. 19, 1946     4 Sheets-Sheet 3

Inventor
Boyd N. R. Lamont
By
Ralph B. Stewart
Attorney

April 11, 1950   B. N. R. LAMONT   2,503,826
PIPE COUPLING
Filed Feb. 19, 1946   4 Sheets-Sheet 4
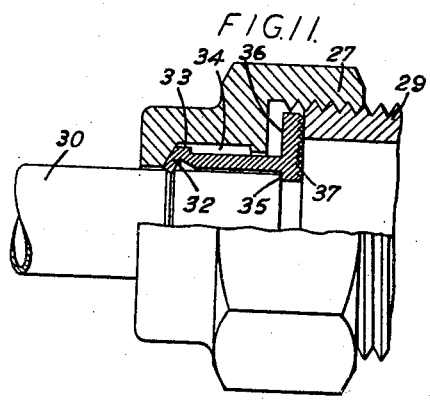
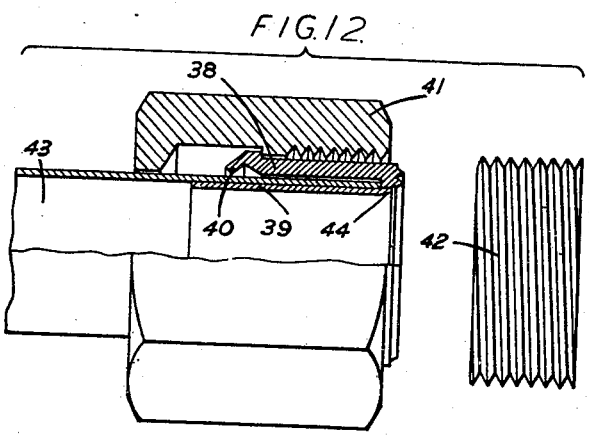
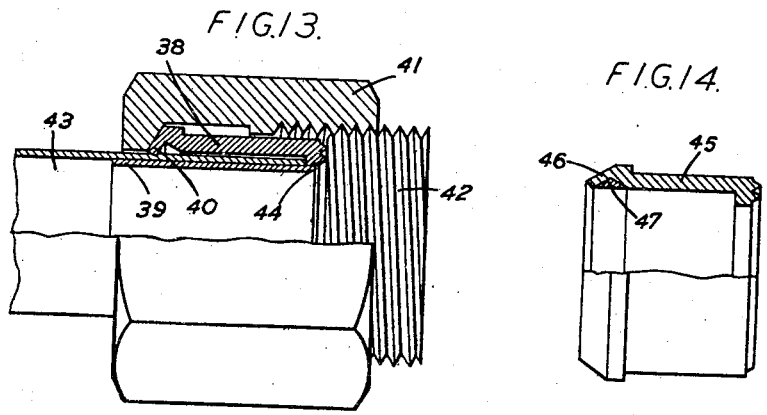
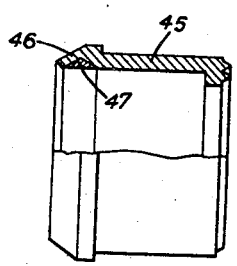
Inventor
Boyd N. R. Lamont
By
Ralph B. Stewart
Attorney Patented Apr. 11, 1950

2,503,826

UNITED STATES PATENT OFFICE 2,503,826

PIPE COUPLING

Boyd Neil Robert Lamont, London, England, assignor to Tube Patents Limited, London, England, a company of Great Britain Application February 19, 1946, Serial No. 648,627
In Great Britain March 9, 1945

12 Claims. (Cl. 285—126)

This invention relates to improvements in or relating to means for coupling together pipes, tubular bodies and the like, said pipes, tubular bodies or the like being hereinafter referred to as "tubular elements," and has for one of its objects to provide simple coupling means capable of effecting an efficient and fluid-tight compression joint.

According to one feature of the present invention there is provided a sealing ferrule for use with a coupling nut, said ferrule having an undercut lip portion of annular form adapted to be urged radially inwards under axial pressure exerted by longitudinal movement of the said coupling nut with respect to the said sealing ferrule.

According to another feature of the present invention there are provided means for coupling together two tubular elements comprising a coupling nut adapted to make screw-threaded engagement with one of said elements and a sealing ferrule adapted to receive the end of the other of the said tubular elements and to be received within said coupling nut in a rotatable and axially slidable manner, wherein said coupling nut is provided with a flange-like part adapted to abut against the end of the sealing ferrule pursuant to axial movement of said nut with respect to said ferrule and said end of the sealing ferrule is provided with an undercut lip portion of annular form adapted under axial pressure to be deformed radially inwards.

The aforesaid lip portion of the sealing ferrule may be of substantially V-section, the forward limb being for instance at an angle of sixty degrees with respect to the axis of the ferrule. It will be appreciated that axial pressure on the said lip portion pursuant to axial sliding movement of the coupling nut with respect to the ferrule causes the inwardly directed edge of said lip portion to dig into the tubular element disposed within the ferrule and during this deformation the dimensions of the space bounded by the undercut portion are of course reduced.

In some cases, such for instance as where the surface of the tubular element to be gripped by the aforesaid sealing ferrule is very rough, difficulties may sometimes be experienced in causing the undercut lip portion of the ferrule to dig into the surface of such element to an extent resulting in the formation of a fluid-tight seal. In order to overcome any such difficulties the cavity extending around the inner surface of the lip portion of the ferrule may be filled with a readily deformable material, e. g. a soft metal or soft metal alloy, such material being pressed into tight sealing engagement with the said tubular element when the lip portion is deformed and the dimensions of the undercut part are accordingly reduced.

During the process of making a seal between the aforesaid sealing ferrule and the tubular element located therein very substantial compressive pressure is exerted on such element and it is within the scope of the present invention to make provision for resisting any collapsing of such element under the pressures sustained, and thereby rendering the invention applicable to the coupling of tubes made for example from soft metal. Thus for instance the sealing ferrule may be provided with a liner spaced inwardly from the wall of the ferrule so as to form an annular space into which the end of the tubular element to be coupled can be inserted, such liner being made from appropriately hard material and being secured if desired to the end of the ferrule remote from that provided with the undercut lip portion. The external periphery of the said liner may be cross-knurled or otherwise treated so that the tubular element is positively gripped by the liner as well as by the ferrule pursuant to a coupling operation.

The end face of the sealing ferrule remote from the end provided with an undercut lip portion is preferably provided with teeth extending therearound so that pursuant to axial movement a fluid-tight junction can be readily made between such face and the part against which it abuts when in use, e. g. the end face of a screw threaded pipe or fitting or the end of another sealing ferrule.

The aforesaid sealing ferrule may be made from non-resilient material in which case after said ferrule has been urged into tight engagement with a tubular element located therein it will remain secured thereto, or it may be made from resilient and springy material in which case the ferrule will be urged into gripping engagement with the said tubular element when the associated coupling nut is moved in a tightening direction and will be freed for return to its original condition when such nut is moved in a loosening direction. The latter arrangement is, in certain circumstances, advantageous as the various parts of the coupling can be used on repeated occasions and in other cases the former arrangement is preferable as it enables the ferrule to be permanently located on the tubular element even when the coupling nut is disconnected.

The aforesaid sealing ferrule is preferably permanently located confined in the associated coupling nut for instance by providing the said ferrule with a shoulder portion which projects into a recess formed in the internal wall of the coupling nut, the diameter of the entrance to such recess being slightly less than the diameter across the said shoulder portion of the ferrule so that the ferrule can be forcibly entered into a position in which axial movement to an extent permitted by the cooperating shoulder portion and recess is afforded but inadvertent separation of the parts is prevented.

Coupling means according to the present invention can be conveniently adapted for use as reducing couplings, i. e. the diameter of the part receiving the undercut lip portion of the sealing ferrule can differ to any required extent from the diameter of the part adapted to make screw-threaded engagement with a tubular element.

The end of the sealing ferrule remote from the end provided with an undercut lip portion is preferably provided with an inwardly directed flange, such flange affording an abutment for locating the tubular element which is slidably received therein. The surface presented for engagement by the tubular element may be at right angles to the axis of the tube or it may be inclined so that an abutting surface of truncated conical form is presented, the latter arrangement being advantageous in some cases as it provides for centering tubular elements of various external diameters, e. g. tubes of the same bore but of various wall thicknesses.

It is also within the scope of the present invention to employ a coupling member in the form of a coupling body instead of a coupling nut, i. e. to employ a coupling member adapted to make screw-threaded engagement with an internally screw-threaded tubular element; and for the purpose of making a fluid tight compression joint between two non-threaded tubular elements the coupling means may comprise a coupling nut provided with a ferrule of the above described kind for cooperation with one of the tubular elements and a coupling body provided with a similar ferrule for cooperation with the other tubular element, said two ferrules being brought into abutting relationship pursuant to screwing the coupling nut onto the coupling body and the axial thrust resulting in fluid tight seals being made between the respective ferrules and the tubes disposed therein and between the abutting surfaces of the ferrules.

In order that the present invention may be well understood some preferred embodiments thereof will now be described, by way of examples only, and reference will be made to the accompanying drawings in which—

Figure 2:
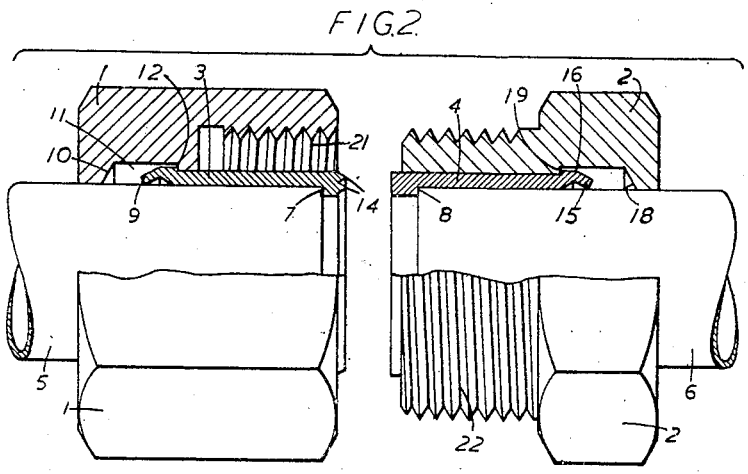
Figures 3, 4:
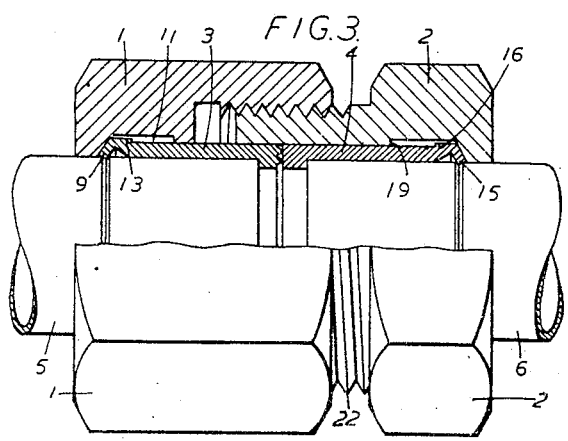
Figure 5:
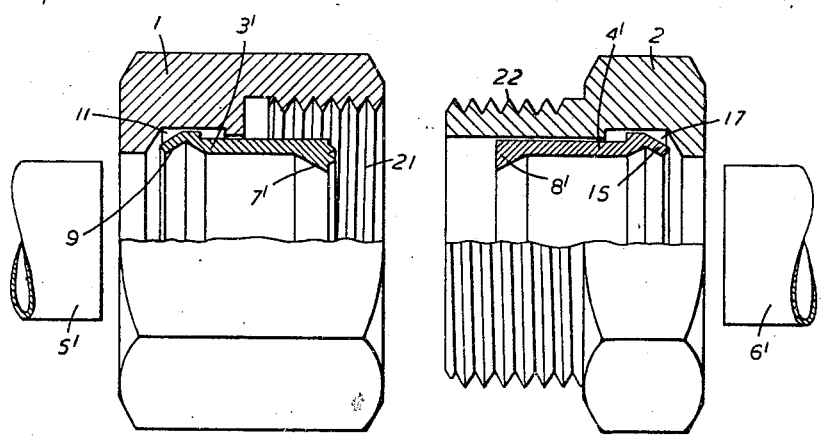
Figure 6:
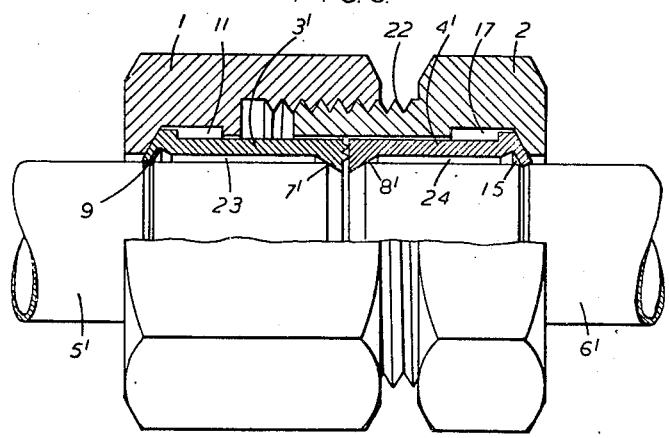
Figure 7:
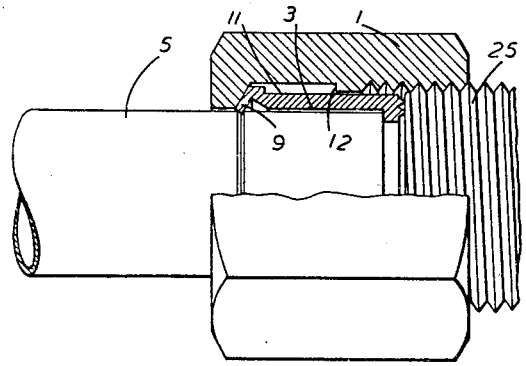
Figure 8:
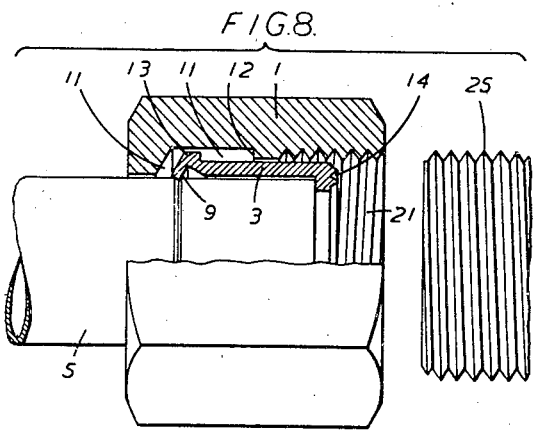
Figure 9:
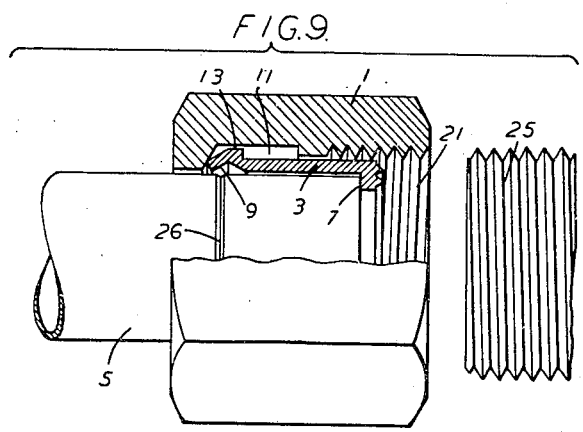
Figure 10:
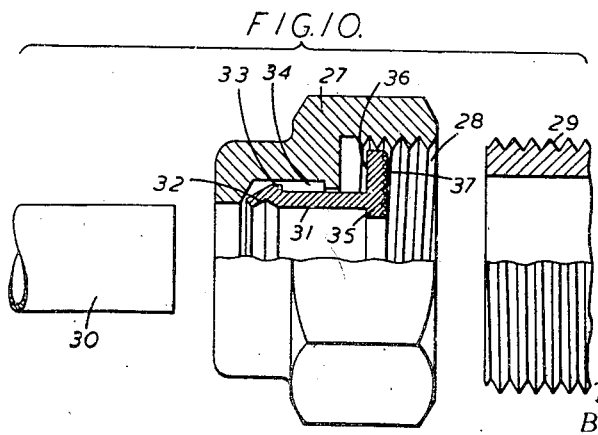

Figure 1 is a half-sectional front elevation showing one form of coupling with the parts thereof and two associated tubes in separated conditions, Figure 2 is a half-sectional front elevation similar to Figure 1 but with the coupling parts and pipes in different relative positions, Figure 3 is a half sectional front elevation similar to Figures 1 and 2 but showing the parts in their coupled condition, Figure 4 is a detail view of part of the assembly shown in Figure 3, Figure 5 is a view similar to Figure 1 but showing a modified form of sealing ferrule, Figure 6 is a half-sectional front elevation of the arrangement shown in Figure 5 but with the several parts in their coupled condition, Figure 7 is a half-sectional front elevation showing another form of coupling in a coupled condition, Figure 8 shows the arrangement shown in Figure 7 but in an uncoupled condition, Figure 9 is a view similar to Figure 8 but showing a modified form of sealing ferrule, Figure 10 is a half-sectional front elevation of another form of coupling with the parts in an uncoupled condition, Figure 11 shows the arrangement illustrated in Figure 10 but in a coupled condition, Figure 12 is a half-sectional front elevation of yet another form of coupling with the parts in an uncoupled condition, Figure 13 shows the arrangement shown in Figure 12 but in a coupled condition, and Figure 14 is a half-sectional front elevation of yet another form of sealing ferrule.

Referring to Figures 1 to 4, the coupling means comprise a coupling nut 1, a coupling body 2, a sealing ferrule 3 located in the nut 1, and a sealing ferrule 4 located in the coupling body 2. The sealing ferrules 3 and 4 have bores appropriate for receiving the ends of pipes 5 and 6, i .e. the ends of the pipes to be interconnected, and flanges 7 and 8 respectively are provided on the ferrules 3 and 4 for correctly locating the said pipes, i. e. limiting their inward movement to the positions shown in Figure 2.

The sealing ferrule 3 is provided with an undercut lip portion 9 of V-form in axial cross-section, the end of such lip portion being presented to the wall 10 of a recess 11 provided in the nut 1. The wall 10 may be disposed radially with respect to the coupling or at any angle less than 90°, e. g. an angle of approximately 30° as shown in the drawings, the arrangement being such that movement of the nut 1 with respect to the sealing ferrule 3, in a direction from left to right as viewed in Figure 1, exerts great axial thrust on the lip portion 9 of the ferrule when the surface 10 abuts against the lip 9.

The above mentioned recess 11 has a wall 12 at the end remote from that provided with the abutment surface 10 and the lip portion 9 is provided with a rim portion 13 the diameter of which is slightly greater than the diameter of the part constituting the wall 12. The sealing ferrule 3 can accordingly be forcibly pressed into the nut 1 into a position in which the rim 13 passes the wall 12 and enters the recess 11, the ferrule thus being trapped in the nut and its inadvertent separation prevented. Thus, wall 12 of recess 11 constitutes locking means for confining or trapping the sealing ferrule within the nut while permitting free rotation and limited axial movement thereof.

The length of the above mentioned recess 11 is such that, as indicated in Figure 2, the end of the ferrule remote from that having the lip portion projects slightly from the nut 1 when the parts are withdrawn to their maximum extent.

The end face of the ferrule remote from the lip-bearing end is provided with circular teeth 14, such teeth serving a purpose which is hereinafter described.

The sealing ferrule 4 is similar to the ferrule 3 in that it includes a lip portion 15 having a projecting rim portion 16, and the coupling body 2 in which it is housed is provided with a cooperating recess 17 bounded at one end by an inclined abutment surface 18 and at the other end by a shoulder 19. The ferrule 4 is accordingly trapped in the coupling body 2 in a manner similar to that in which the ferrule 3 is trapped in the coupling nut 1 and in both cases radial deformation of the lip portions of the respective ferrules is attainable by axial movement of their housings beyond the positions in which such housings abut against the lip portions of said ferrules.

The ferrule 4 differs from the ferrule 3 in that the end face 20 presented towards the toothed end face of the said ferrule 3 has a plane surface, such arrangement ensuring that when the ferrules are urged forcibly together the teeth 14 bite into the face 20 and make a fluid-tight junction.

The bore of the coupling nut 1 is provided with a screw thread 21 and the coupling body 2 is provided with a correspondingly screw-threaded boss 22.

Assuming that the above described coupling means are to be used for coupling the pipes 5 and 6, the coupling nut 1 and the coupling body 2 are supplied with the ferrules inserted therein so that any risk of inadvertent separation of such ferrules during subsequent assembly is entirely avoided. The pipe 5 is then passed through the ferrule 3 into the position shown in Figure 2 and the pipe 6 is passed through the ferrule 4 into the position also shown in that figure. The two assemblies are then brought together and the nut is screwed onto the coupling body 2. During the initial part of the coupling operation there is free axial movement of the coupling nut and body with respect to their enclosed sealing ferrules but as soon as the lip portions 9 and 15 abut against the inclined faces 10 and 18 respectively continued axial movement exerts great axial thrust on the said lip portions and this is resolved into inward movement of the ends of such lip portions with the result that the peripheral edges of such portions bite into the surfaces of the pipes 5 and 6 as indicated in Figures 3 and 4 of the drawings and at the same time the teeth 14 are caused to bite into the end surface 20 of the ferrule 4. A liquid tight joint is accordingly effected between the ferrules 3 and 4 and also between the ferrule 3 and pipe 5 and between the ferrule 4 and pipe 6. Moreover, any axial separation of the pipes 5 and 6 is prevented by the intense gripping of such pipes by the respective ferrules and by the positive engagement resulting from the lip portions of the ferrules digging into the respective pipes.

It will be observed that in the arrangement shown in Figures 1 to 4 the pipes 5 and 6 are coupled together by means of a single coupling nut cooperating with a coupling body and two sealing ferrules; this represents a reduction in the number of parts required as compared with known forms of couplings wherein for the purpose of making compression joints between two pipes a coupling body and two cooperating coupling nuts are required.

In the arrangement shown in Figures 5 and 6 the coupling nut and coupling body are identical with those described with reference to the earlier figures and corresponding parts are accordingly designated by similar reference numerals and do not require further description. A sealing ferrule 3' having an undercut lip portion identical with that described with reference to the earlier figures is trapped in a recess in the coupling nut and a sealing ferrule 4' is trapped in the coupling body 2, the latter ferrule having a lip portion identical with that of the ferrule 4. The ends of the ferrules 3' and 4' remote from the ends provided with undercut lip portions, are however provided with inwardly directed flange portions which are deeper than the corresponding portions of the ferrules 3 and 4 and the inner faces of such flanges, designated 7' and 8', are of truncated conical form instead of being radially disposed. The so-formed faces provide for cooperation with tubes of various external diameters, e. g. tubes of equal bores but of various wall thicknesses. In the arrangement shown for instances in Figures 5 and 6 the pipes 5' and 6' are of smaller external diameter than the corresponding pipes shown in Figures 1 to 3 but the bores of the tubes may be similar. The inclined abutment surfaces 7' and 8' exert a centering action on the pipes 5' and 6' as the latter are pressed against such surfaces, so leaving uniform annular spaces 23 and 24, as shown in Figure 6, between the pipes 5' and 6' and the respective ferrules 3' and 4'.

The outer face of the flanged end of one of the ferrules 3' and 4' is provided with annular teeth 14 as in the earlier described arrangement so that when the coupling is completed i. e. when the parts are in the condition shown in Figure 6, a fluid-tight joint is made between the abutting ferrules at the same time as fluid-tight joints are made by the lip portions of the ferrules biting into the respective pipes.

In the arrangement shown in Figures 7 and 8 a coupling nut and associated sealing ferrule identical with the nut and ferrule shown in Figure 1 to 3 are employed and such parts are accordingly designated by corresponding reference numerals and will not be again described. The nut 1 in this arrangement cooperates directly with a screw-threaded member 25, e. g. the screw-threaded end of a pipe or the screw-threaded boss of a junction or fitting, instead of with a coupling body. The teeth 14 on the end face of the flange on the inner end of the ferrule accordingly contact directly with the opposed face of the fitting 25 and make fluid-tight contact therewith at the same time as the lip 9 digs into the surface of the pipe 5, the parts being shown in their coupled position in Figure 7 of the drawings.

Assuming that the ferrule 3 is made from non-springy material the operation of deforming the lip of the sealing ferrule into fluid-tight engagement with the pipe 5 will result in such ferrule remaining in firm attachment to the pipe 5 even though the coupling nut be disconnected, i. e. the sealing ferrule will be in the form shown in Figure 8. This arrangement offers considerable advantages in many applications and amongst these may be mentioned the plumbing or pipe systems for prefabricated houses. Thus the various pipes of the system can be cut to length and the whole system erected at the factory and upon breaking the joints the ferrules and nuts will be located on the pipe ends, the ferrules in a tight condition and the nuts in a condition free for rotation and limited axial movement. The pipe ends are accordingly protected against any damage during the transit or eventual erection and moreover the necessity for transporting loose couplings and coupling parts to the site and the consequent risk of loss of such parts is entirely avoided. The operation of erecting the pipe system on the site is then very simple and indeed work which does not involve any skilled labour.

It may however not always be desired to effect permanent locking of the ferrule onto the tube with which it is associated i. e. it may be desired to provide for all of the coupling parts to be separable from the associated pipe and it is therefore within the scope of the present invention to make such ferrule from appropriately resilient or springy material to result in the lip portion of the ferrule springing back to its original position upon loosening the coupling nut. Such an arrangement is shown in Figure 9 of the drawings where the coupling shown is otherwise identical with that shown in Figures 7 and 8 and corresponding parts are accordingly designated by similar reference numerals. In Figure 9 the ferrule is shown in the position it assumes upon loosening the coupling nut after a joint has been made, the lip 9 being shown in a position in which it has sprung away from the groove 26 formed by the lip digging into the pipe 5 during the first coupling operation.

It is of course to be appreciated that the ferrules shown in Figures 1 to 6 may be of springy or non-springy material dependent upon whether it is desired that such ferrules remain in engagement with or become freed from the pipe concerned upon disconnecting the coupling nut.

In the arrangement shown in Figures 10 and 11 the coupling means are of a kind suitable for use as a reduction coupling. In this arrangement the coupling comprises a coupling nut 27 having a screw-threaded mouth portion 28 for cooperation with a correspondingly screw-threaded pipe or fitting 29, the opposite end of such nut being of reduced bore for receiving the end of a pipe 30 with which a compression joint is to be made. A sealing ferrule 31 is located in the nut 27, such ferrule having an undercut lip portion 32 similar to the lip portion of the earlier described embodiments and also having a projecting rim portion 33 which is trapped in a recessed portion 34 of the nut in a manner similar to that already described.

The ferrule 31 is provided with an internal flange 35 at the end remote from the lip portion 32 so as to provide a locating abutment for the pipe 30 and it is also provided with an outwardly extending flange 36, the outer face 37 of such flange being adapted to make a butt joint with the end of the pipe of fitting 29 and preferably being provided with annular teeth, as shown, for the purpose hereinbefore described.

The ferrule 31 may be of springy or non-springy material dependent upon whether it is desired that such ferrule be permanently secured to the pipe upon the first coupling being completed or whether it is desired that such ferrule be released from the pipe upon releasing the nut.

In the arrangement shown in Figures 12 and 13 the coupling is of a kind adapted for use with pipes which are too ductile or weak to withstand the inward thrust of the lip portion of the associated ferrule 11 pursuant to tightening of the coupling nut. In this arrangement the ferrule 38 is provided with a liner 39 but it is in other respects similar to the ferrules already described e. g. as to the form and function of the undercut lip portion 40 and the manner in which it is trapped for rotary but limited axial movement in the coupling nut 41. The said nut 41 is also provided with a screw-threaded bore for engagement with a screw-threaded tubular member 42 which may be the end of a pipe or the boss of any fitting for association with the pipe 43, i. e. the pipe to be connected by a compression joint.

The liner 39 may be secured to the sealing ferrule 38 at its inner end in any convenient way e. g. by spinning a lip portion 44 of said liner into tight engagement with the suitably contoured inner periphery of the flange provided at the inner end of the liner.

The aforesaid liner 39 and ferrule 38 are concentrically disposed and together form an annular recess for receiving the end of the pipe 43, such pipe during assembly being inserted in such recess into the position shown in the figures, i. e. a position in which its end butts against the flange at the end of the ferrule.

The ferrule 38 may be made from a springy or non-springy material as desired and the liner 39 is made from material of suitable rigidity for preventing any undesirable collapsing of the pipe 43 during the coupling operation i. e. during the very substantial inward pressure with which the lip 40 presses against the pipe during the deformation of such lip in the manner already described. If desired the outer surface of the liner may be knurled so that it makes a positive grip with the tube.

The above described couplings are suitable for very varied purposes and for coupling together tubular elements of very varied kinds. It may be found however that in special cases, such for instance as where the tubular element has a very hard and rough exterior that there is a difficulty in attaining a joint which is fluid tight at high pressures. The present invention also provides however for dealing with these cases and other cases where provision for additional or subsidiary sealing is required for the provision of a comparatively soft filling in the cavity of the undercut lip portion of the ferrule. One specific embodiment incorporating this feature is shown in Figure 14 where the ferrule 45 is identical with that shown in Figures 1 to 4 subject to the annular recess on the inner periphery of the lip portion 46 being filled with a soft insert 47. This insert may be made from soft metal or any other suitable material and it may be located in the recess by means of a spinning operation or in any other convenient way.

When the lip 46 is deformed pursuant to the associated coupling nut being tightened the loaded recess is reduced in volume with the result that the soft material 47 is urged from said recess in a radial direction, so filling any crevices in the opposed surfaces of the pipe located in the ferrule and ensuring that a perfectly fluid tight joint is made.

It will be appreciated that any or all of the ferrules shown in Figures 1 to 13 may be modified in the manner indicated in Figure 14, i. e. by the addition of a filling of soft metal or other suitable soft material in the cavity in the undercut lip portion of the ferrule.

Whilst several embodiments of the present invention have been hereinbefore described, it is to be understood that there may be various changes without departing from the scope of such invention. Thus for instance the sealing ferrules need not necessarily cooperate with the associated coupling nut and/or coupling body in such a manner that they are permanently located therein although the latter arrangement is generally desirable. It is also within the scope of the present invention to make the coupling parts of any desired dimensions and from any suitable material.

I claim:

1. A device for coupling together two tubular elements comprising a coupling member of annular form and a sealing ferrule disposed within said coupling member and adapted to receive one of the said tubular elements, said sealing ferrule being provided with an outwardly projecting shoulder and the bore of said coupling member being provided with an annular recess receiving said shoulder, one wall of said recess serving as locking means permanently confining said sealing ferrule within said coupling member whilst permitting of relative rotary movement and limited axial sliding movement of said sealing ferrule with respect to said coupling member, and said sealing ferrule being provided at one end with an undercut lip portion adapted to be urged inwardly when pressed against the coupling member and at the other end with a cylindrical liner extending over but spaced from the inner peripheral surface of said ferrule, the annular space between the ferrule and the liner being adapted to receive the tubular element with which the lip portion of the ferrule is to make contact.

2. A device for coupling together two tubular elements comprising a coupling member of annular form and a sealing ferrule disposed within said coupling member and adapted to receive and be compressed upon one of the said tubular elements, said sealing ferrule being provided with a radially projecting shoulder portion and the coupling member being provided with an annular space receiving said shoulder portion, locking means on said coupling member and cooperating with said shoulder portion to permanently retain said ferrule in said coupling member whilst at the same time permitting of relative rotary movement and limited axial sliding movement of said ferrule with respect to said coupling member, said sealing ferrule undercut lip portion, and being provided with an inwardly extending flange on said coupling member positioned to engage said lip portion and urge it radially inwards upon relative axial movement between said coupling member and said ferrule.

3. A device for coupling together two tubular elements comprising a coupling member of annular form, a sealing ferrule arranged within said sealing member and adapted to receive one of the said tubular elements, locking means on said coupling member for permanently confining said ferrule within said coupling member whilst permitting free rotation and limited axial sliding movement of said ferrule, one end of said ferrule being provided with an undercut lip portion for cooperation with an inwardly extending flange on the coupling member, and the other end of said ferrule being provided with an inwardly extending flange constituting an abutment for the end of one of the said tubular elements.

4. A device for coupling together two tubular elements comprising a coupling member of annular form, a sealing ferrule arranged within said coupling member and adapted to receive one of the said tubular elements, locking means on said coupling member for permanently confining said ferrule within said coupling member whilst permitting free rotation and limited axial sliding movement of said ferrule, one end of said ferrule being provided with an undercut lip portion for cooperation with an inwardly extending flange on the coupling member, and the other end of said ferrule being provided with an inwardly extending flange consituting an abutment for the end of one of the said tubular elements, said last mentioned flange being of conical form so as automatically to center the said tubular member when the latter is pressed thereagainst.

5. A device for coupling together two tubular elements comprising a coupling member of annular form, a sealing ferrule arranged within said coupling member and adapted to receive one of the said tubular elements, locking means on said coupling member for permanently confining said ferrule within said coupling member whilst permitting free rotation and limited axial sliding movement of said ferrule, one end of said ferrule being provided with an undercut lip portion for cooperation with an inwardly extending flange on the coupling member, the other end of said ferrule being provided with an inwardly extending flange constituting an abutment for the end of one of the said tubular elements, and annular teeth provided on the end surface of said last mentioned flange.

6. A device for coupling together two tubular elements comprising a coupling member of annular form adapted to make screw threaded engagement with one of said elements, a sealing ferrule disposed within said coupling member and adapted to make a compression joint with the other of said tubular elements, and locking means on said coupling member for permanently confining said sealing ferrule within said coupling member whilst permitting free rotary and limited axial sliding movement of said ferrule with respect to said coupling member.

7. A device for coupling together two tubular elements comprising a coupling nut adapted to make screw-threaded engagement with one of said elements, a sealing ferrule disposed within said nut and adapted to make a compression joint with the other of said tubular elements, said ferrule being provided with an outwardly projecting shoulder and said coupling nut being provided with a recess for receiving said shoulder, one wall of said recess comprising locking means for permanently confining the sealing ferrule within the coupling nut whilst permitting it to rotate and slide axially to a limited extent with respect to said nut.

8. A device for coupling together two tubular elements as claimed in claim 7 wherein that part of the bore of the coupling nut which is screw-threaded for engagement with one of the tubular members is of greater diameter than that part of the bore in which the sealing ferrule is slidably located, thereby enabling a compression joint to be made with a tubular element of smaller diameter than that of the said screw-threaded tubular element.

9. A device for coupling together two tubular elements as claimed in claim 8 wherein a flange provided at the end of the sealing ferrule extends radially outwards into the said screw-threaded part of the bore of the coupling nut.

10. A device for coupling together two tubular elements comprising a coupling body, an external screw thread on said coupling body for engagement by a coupling nut, a sealing ferrule disposed within said coupling body and adapted to receive one of said tubular elements, a shoulder extending outwardly from said ferrule, said coupling body having a recess in the bore thereof receiving said shoulder, one wall of said recess comprising locking means for permanently trapping the sealing ferrule in the said body whilst allowing such ferrule to rotate and slide axially to a limited extent with respect to said coupling body, and an undercut lip portion at one end of said sealing ferrule for compression against the received tubular element when said coupling body and coupling nut are screwed together.

11. A device for coupling together two tubular elements comprising in combination an externally screw-threaded coupling body, an internally screw-threaded coupling nut for engagement with said coupling body, a sealing ferrule located in said coupling body and adapted to receive one of said tubular elements, a shoulder extending outwardly from said sealing ferrule, said coupling body having a recess in the bore thereof receiving said shoulder, one wall of said recess comprising locking means for permanently trapping said ferrule in said coupling body whilst allowing it to rotate and to slide axially to a limited extent with respect thereto, a sealing ferrule located in said coupling nut and adapted to receive the other of said tubular elements, a shoulder extending outwardly from said last mentioned ferrule, said coupling nut having a recess in the bore thereof receiving said last mentioned shoulder, one wall of said recess comprising locking means for permanently trapping said sealing ferrule in said coupling nut whilst allowing it to rotate and slide axially to a limited extent with respect thereto, and undercut lip portions on said two ferrules adapted to make compression joints with the respective tubular elements disposed therein.

12. A device for coupling together two tubular elements as claimed in claim 6 wherein said sealing ferrule is provided with an internal liner secured at one end to the ferrule and having the external surface thereof spaced from the internal surface of the ferrule thereby forming an annular space for receiving one of said tubular elements.

BOYD NEIL ROBERT LAMONT.

REFERENCES CITED

The following references are of record in the file of this patent:

UNITED STATES PATENTS

| Number | Name | Date |
|---|---|---|
| 781,157 | Powell | Jan. 31, 1905 |
| 1,840,312 | Dunmire | Jan. 12, 1932 |
| 2,069,177 | Craver | Jan. 26, 1937 |
| 2,355,871 | Kraft | Aug. 15, 1944 |

FOREIGN PATENTS

| Number | Country | Date |
|---|---|---|
| 2,210 | Great Britain | Aug. 27, 1908 |